(12) United States Patent
Miura et al.

(10) Patent No.: US 6,645,893 B2
(45) Date of Patent: Nov. 11, 2003

(54) GLASS SUITABLE FOR OPTICAL FUNCTIONAL ELEMENTS AND PROCESS FOR PRODUCING SAME

(75) Inventors: Kiyotaka Miura, Yamaguchi (JP); Seiji Fujiwara, Yamaguchi (JP); Takuya Teshima, Yamaguchi (JP); Natsuya Nishimura, Yamaguchi (JP); Yoshinori Kubota, Yamaguchi (JP)

(73) Assignee: Central Glass Company, Limited, Ube (JP)

( * ) Notice: Subject to any disclaimer, the term of this patent is extended or adjusted under 35 U.S.C. 154(b) by 72 days.

(21) Appl. No.: 09/788,663

(22) Filed: Feb. 21, 2001

(65) Prior Publication Data

US 2001/0031691 A1 Oct. 18, 2001

(30) Foreign Application Priority Data

Feb. 22, 2000 (JP) .................................. 2000-043871

(51) Int. Cl.[7] ............................. C03C 14/00; C03C 3/16; C03C 3/23
(52) U.S. Cl. .......................... 501/32; 501/40; 501/41; 501/43; 501/44; 501/47; 501/49; 501/53; 65/17.1; 65/32.3; 65/33.2; 65/33.3
(58) Field of Search ................. 501/32, 40, 41, 501/43, 44, 47, 49, 53; 65/17.1, 32.3, 33.2, 33.3, DIG. 15

(56) References Cited

U.S. PATENT DOCUMENTS

| 4,321,073 A | * | 3/1982 | Blair | ........................ 118/50.1 |
| 5,098,460 A | * | 3/1992 | Omi et al. | ................. 423/509 |
| 5,162,054 A | * | 11/1992 | Omi | ............................ 423/509 |

FOREIGN PATENT DOCUMENTS

| DE | 19841547 | 3/2000 |
| EP | 0989102 | 3/2000 |
| JP | 11060271 | 3/1999 |

OTHER PUBLICATIONS

Inoue et al., "Fabrication of Two–Dimensional Photonic Band Structure with Near–Infrared Band Gap". *Jpn. J. Appl. Phys.* 33: L1463–L1465 (1994). No month.

Cheng et al., "Lithographic Band Gap Tuning in Photonic Band Gap Crystals". *J. Vac. Sci. Technol.* B14(6): 4110–4114 (1996). No month.

Kawakami, "Fabrication of Submicrometre 3C Periodic Structures Composed of $Si/SiO_2$". *Electron. Lett.* vol. 33 No. 14 pp. 1260–1261 (1997). No month.

M. Kaempfe, "Ultrashort Laser Pulse Induced Deformation of Silver Nanoparticles in Glass" Applied Physics Letters, Mar. 1999.

L. Zhang, "Properties of Luminescent Si Nanoparticles in Sol–Gel Matrices" Journal of Sol–Gel Science and Technology, 1998. No month.

H. Hosono, "Formation of Nanoscale Phosphorus Colloids in Implanted $SiO_2$ Glass" Journal of Non–Crystalline Solids, 1992. No month.

* cited by examiner

*Primary Examiner*—Elizabeth D. Wood
(74) *Attorney, Agent, or Firm*—Crowell & Moring LLP

(57) ABSTRACT

A glass includes (a) a matrix containing a compound of at least one nonmetallic element; and (b) a particle selectively formed in the matrix. This particle is made of the at least one nonmetallic element. A process for producing such glass includes (a) providing a blank glass containing a compound of at least one nonmetallic element; (b) condensing a pulsed laser beam to a focal point in the blank glass such that a particle is selectively formed in the blank glass at a position corresponding to the focal point, the particle being made of the at least one nonmetallic element dissociated from the compound; and (c) moving the focal point in the blank glass to produce a pattern of the particle. The glass is suitable for optical functional elements.

26 Claims, 2 Drawing Sheets

GLASS SUITABLE FOR OPTICAL FUNCTIONAL ELEMENTS AND PROCESS FOR PRODUCING SAME

BACKGROUND OF THE INVENTION

Several processes for forming an artificial multidimensional cyclic or periodic structure having a periodicity substantially equal to that of a wavelength of the light are known. K. Inoue et al., Jpn. J. Appl. Phys. Lett., Vol. 33, L1463 (1994) discloses a process for stretching a round-hole-carrying fiber plate. C. C. Cheng et al., J. Vac. Sci. Technol., B14, 4110 (1996) discloses a process for forming a submicron cyclic structure with respect to GaAs by dry etching. S. Kawakami, Electron. Lett., Vol. 33, No. 14, 1260 (1997) discloses a process for forming a cyclic recessed and projecting pattern on a quartz substrate by the electron beam lithography and dry etching techniques, and thereafter laminating a multilayer film on the resultant substrate by a bias sputtering method provided with a Si target, a $SiO_2$ target and a rotary substrate electrode in the same chamber. On the other hand, a process for applying an Ar excimer laser beam of 126 nm wavelength and an electron line under vacuum to a surface of $SiO_2$ glass, and thereby cutting off a Si—O bond, whereby Si can be formed, is known as a process for generating non-metal ions from glass. However, since the greater part of the excimer laser beam and electron line are absorbed in the surface of the glass, the formation of Si occurs only on the surface thereof, and Si cannot be deposited selectively in the interior of the glass. Therefore, this method does not permit forming a multi-dimensional cyclic structure.

Regarding the formation of an artificial multidimensional cyclic structure, the above-mentioned fiber plate stretching method in which a fiber plate is stretched in one direction permits in principle forming an up to only two-dimensional cyclic structure. In the method using dry etching techniques, there is a limit to an aspect ratio (a ratio of depth to diameter), so that the periodicity of a three-dimensional arrangement is limited. The bias sputtering method permits selecting a structure (shape), and does not have limitations on the periodicity, this method being able to form a three-dimensional cyclic structure. However, a cyclic structure formed by this method is influenced greatly by the shape of a substrate formed by dry etching techniques. Therefore, a uniform cyclic structure can be formed but it is difficult to form structures of a discontinuous cycle, and continuously form cyclic structures of different patterns.

SUMMARY OF THE INVENTION

It is an object of the present invention to provide a glass suitable for optical functional elements, which contains a nonmetallic element particle selectively formed in a matrix of the glass.

It is another object of the present invention to provide a process for producing such glass.

According to the present invention, there is provided a glass suitable for optical functional elements. This glass comprises (a) a matrix comprising a compound of at least one nonmetallic element; and (b) a particle selectively formed in said matrix. This particle is made of said at least one nonmetallic element dissociated from said compound by condensing a pulsed laser beam in said matrix.

According to the present invention, there is provided a process for producing a glass suitable for optical functional elements. This process comprises (a) providing a blank glass that is a raw material of said glass, said blank glass comprising a compound of at least one nonmetallic element; (b) condensing a pulsed laser beam to a focal point in said blank glass such that a particle is selectively formed in said blank glass at a position corresponding to said focal point, said particle being made of said at least one nonmetallic element dissociated from said compound; and (c) moving said focal point in said blank glass to produce a pattern of said particle.

BRIEF DESCRIPTION OF THE DRAWINGS

Preferred embodiments of the present invention will be described in detail with reference to the following drawings.

DESCRIPTION OF THE PREFERRED EMBODIMENTS

Figure 1:
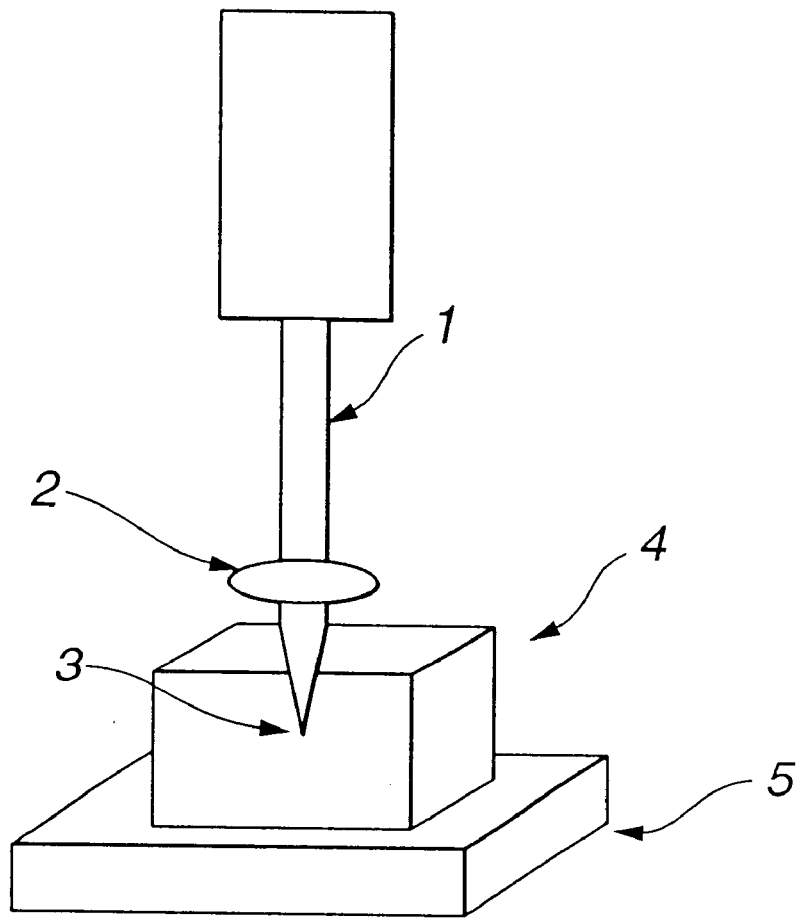
FIG. 1 is a schematic diagram of an apparatus for practicing the nonmetallic particle depositing method according to the present invention.

Hereinafter, a glass according to the present invention may be referred to as "a nonmetallic particle deposited glass" for simplification. This glass can be obtained by selectively forming regions, in which nonmetallic particles (i.e., particles made of at least one nonmetallic element) are deposited in a dotted or linear state, in the interior of a glass material (matrix) in a cycle the periodicity of which is substantially equal to that of a wavelength of the light, and thereby forming an artificial multidimensional cyclic or periodic structure having a cycle the periodicity of which is substantially equal to that of a wavelength of the light. The glass can effectively be applied to optical function elements, such as an optical filter, an optical wave multiplexing and demultiplexing device and a light dispersion compensation element, which are adapted to control the light in a two-dimensional or three-dimensional space. Thus, according to the present invention, it is possible to provide a nonmetal-deposited glass having a multidimensional cyclic structure of an arbitrary pattern; and to provide a process for forming a multidimensional cyclic structure easily, and for manufacturing a nonmetal-deposited glass having a high degree of freedom of forming patterns.

The nonmetallic compound (i.e., the compound of at least one nonmetallic element) in the present invention can be an oxide, halide or the like containing at least one nonmetallic element selected from Si, B, C, P, Se and Te. The deposited nonmetallic particles are made of the at least one nonmetallic element (selected from Si, B, C, P, Se and Te) dissociated from the nonmetallic compound. The nonmetallic particle deposited glass is formed by condensing or convergently applying a pulsed laser beam to a nonmetallic-compound-containing glass material (i.e., a blank glass) so that a converging point is positioned in the interior of the glass material. The nonmetallic particles are selectively deposited in a dotted or linear state in a position in the vicinity of the laser beam converging point (i.e., focal point) by relatively moving the converging point in the interior of the glass material, or by turning on and off the laser beam while relatively moving the converging point. With this, it is possible to form a multidimensional cyclic or periodic structure in which the nonmetallic particles are deposited in an arbitrary shape, for example, a dotted or linear shape.

In the present invention, a pulsed laser beam is convergently applied to the interior of glass, whereby refractive index variation depending upon the intensity distribution of the pulse beam occurs in the interior of the glass. As a result, the pulse beam self-converges (not diverges but continues to be converged over a predetermined distance, though the converged light primarily diverges again) in the interior of the glass to cause a local energy density to increase. When a predetermined energy density is attained, the optical energy is transmitted to the glass owing to multiple photon absorption in which an absorption coefficient is proportioned to n-th power of the intensity of the laser beam even when a light absorption region of the glass and a wavelength of the pulse beam do not agree with each other. Owing to the energy momentarily accumulated in a local region of the interior of the glass, the temperature and pressure of the portion of the glass which corresponds to the laser beam converging point increase momentarily. Therefore, the nonmetallic compound contained in the glass is dissociated, and the particles formed of dissociated nonmetals (in the elemental form) gathering together are deposited in a position in the vicinity of the laser beam converging point. A pulse width of the pulsed laser beam applied to the glass is not specially limited but, when the optical energy is consumed for the expansion of the glass and the thermal diffusion, a deposition efficiency of the nonmetallic particles may be deteriorated. Therefore, it is preferable to use a laser beam having the smallest possible pulse width, transmit the optical energy to the glass in a short period of time, and set the pulse width not higher than 500 femto-seconds.

The nonmetallic particles to be deposited in the interior of the glass by the application of a pulsed laser beam thereto include those of Si, B, C, P, Se, Te and complex materials thereof. For example, the nonmetallic compounds to be contained in a glass material for depositing Si therein include $SiO_2$; for depositing B, $B_2O_3$; for depositing P, $P_2O_5$; for depositing Se, $SeO_2$; and for depositing Te, an oxide of a nonmetallic element, such as $TeO_2$, and a nonmetallic-element-containing halide. The nonmetallic particles are preferably in the form of solid at normal temperature (e.g., room temperature) when the production of glass is taken into consideration. When an organic substance is added as a nonmetallic compound, C (carbon) can be deposited.

It is preferable to have a first condition in which a glass material (matrix) is formed of first cations (for example, Ti ions, Zr ions and Al ions), which are less reducible than second cations (e.g., $Si^{4+}$) of the nonmetallic elements. With this, as compared with the first cations, the second cations are selectively more easily reduced to the nonmetallic elements by condensing a pulsed laser beam in a blank glass, thereby forming the nonmetallic particles. Furthermore, it is preferable to have a second condition in which the actual molar ratio of positive ions contained in a blank glass to negative ions contained in the blank glass is greater than a stoichiometric molar ratio of the positive ions to the negative ions. For example, in case that silicon oxide is to be contained in a blank glass, it is preferable to use a silicon oxide represented by the formula $Si_xO_2$ where x is greater than 1. In this case, the stoichiometric molar ratio is 1:2 for $SiO_2$. Under the above-mentioned first and second conditions, it is possible to form particles of a nonmetallic element owing to the dissociation of a nonmetallic compound caused by a pulsed laser beam with a small amount of energy and at the same time to prevent oxidation of the deposited nonmetallic particles.

The diameter of the nonmetallic particles to be deposited can be varied suitably with the kind of the nonmetal in accordance with the purpose. For example, in order to form in the interior of glass a multidimensional cyclic (periodic) structure for the light of a 1.5-μm band utilized in optical communication, it is preferable to deposit Si having a particle diameter of around 0.5 μm. A range of the diameter of nonmetallic particles is to be limited in accordance with a light transmission region, and special limitations are not placed thereon. A wavelength of the light which can be used for general glass materials is around 0.2–4 μm. In order to control the light, it is necessary that an interval or pitch (cycle) of cyclic structures be set substantially equal to an assumed wavelength of light within a medium. When the interval of cyclic structures is out of this range, the light may be absorbed to suffer a loss. Therefore, the particle diameter is preferably around 0.1–2 μm, a half of the above-mentioned wavelength of 0.2–4 μm.

In order to selectively deposit nonmetallic particles in the interior of glass, a pulsed laser beam is converged inside the same. When a converging point is moved in the glass, a nonmetallic compound is dissociated only at the portion of the glass in which the pulsed laser beam is converged, to cause nonmetallic particles to be formed. During this time, the nonmetallic particles can be deposited in a dotted or linear state in the interior of the glass by spot irradiation or continuous irradiation of the pulsed laser beam. Furthermore, when the converging point is moved three-dimensionally relative to the glass, a three-dimensional nonmetallic particle deposited region is formed in the glass, so that a multidimensional cyclic structure made of nonmetallic particles can be formed in the interior of the glass. It is possible to move the laser beam converging point relative to the glass by moving the glass material while the laser beam converging point is fixed at a position, or by moving the converging point while the glass material is fixed at a position, or by moving both of the converging point and the glass material.

The diameter of the nonmetallic particles to be deposited can be varied by changing the amount of pulse energy of a laser beam applied to glass, the pulse width, the number of irradiation pulses, the diameter of a light-converged spot and the amount of a nonmetallic compound to be contained in the glass.

The wavelength of a pulsed laser beam is preferably not in agreement with the absorption wavelength region of the glass. However, when the absorption of the laser beam occurs to such an extent that permits power density high enough to deposit nonmetallic particles in only a portion of the glass which is in the vicinity of the laser beam converging point, such a pulsed laser beam can be used in the invention. When the wavelength of the pulsed laser beam agrees with the absorption wavelength of the glass, the optical energy is absorbed in an area other than the laser beam converging area, for example, in a surface of the glass. When the optical energy is absorbed in the glass surface, at which an increase in the temperature and pressure occurring due to the confinement of energy is small as compared with that in the interior of the glass, it may become difficult to deposit nonmetallic particles. Namely, a portion of the glass in which the deposition of nonmetallic particles occurs may be limited to the surface thereof, and the multi-dimensional deposition of nonmetallic particles may not be attained.

The following nonlimitative examples are illustrative of the present invention.

EXAMPLE 1

A raw material was weighed 10 g so that the composition expressed by mol % of the material became $80SiO_2$—$20Al_2O_3$. The material was melted in a nitrogen atmosphere in a high-density carbon crucible at 2600° C. for 5 minutes, and a resultant product was quenched to produce a hemispherical glass sample. This glass sample was cut and polished to form a 2 mm thick plate type sample. The sample thus obtained was irradiated with a converged pulsed laser beam by a process shown in FIG. 1. Namely, the pulsed laser beam 1 was converged by a lens 2, and regulated so that a converging point 3 was positioned in the interior of the sample 4 on an XYZ stage 5. As the pulsed laser beam 1, the light oscillated by an Ar laser beam-excited Ti-sapphire laser and having a pulse energy of 5 $\mu$J, a pulse width of 130 femto-seconds, a repeated cycle of 20 Hz and a wavelength of 800 nm was used. Simultaneously with the starting of the application of this laser beam to the glass sample, the glass sample was scanned therewith at a speed of 10 $\mu$m/sec in the X-direction. After the completion of the laser beam application operation, the glass sample was observed through an optical microscope. With this, around 40 black dots were discovered along a laser beam-irradiated region of 20 $\mu$m in length. These black dots were observed three-dimensionally through a confocal laser scanning microscope. With this, the dots were found to be nearly spherical particles of about 0.3 $\mu$m in diameter. The glass sample was then polished until the black dots appeared on the surface thereof, and a surface analysis of the resultant product by ESCA was made. With this, it was found that the black dots deposited in a laser pulse beam-applied region were formed of Si.

EXAMPLE 2

A raw material was weighed 30 g so that the composition expressed by mol % of the material became $50SiO_2$—$50Al(PO_3)_3$. This material was melted in a platinum crucible at 1500° C. for 60 minutes, and the resultant glass was quenched. This glass was cut and polished to produce a plate type sample of 4 mm in thickness. The glass sample was then moved at a speed of 500 $\mu$m/sec in the X-direction as a pulsed laser beam having a pulse energy of 2 $\mu$J, a pulse width of 130 femto-seconds, a repeated cycle of 200 kHz and a wavelength of 800 nm was convergently applied by the same method as that in Example 1 to a portion of the glass sample which was 2 mm under an outer surface thereof. The application of the laser beam was then stopped once, and a focal position was moved 2 $\mu$m in the Y-direction. Then, the glass sample was moved in the –X direction at a speed of 500 $\mu$m/sec as the convergent application of the laser beam was carried out again. These operations were repeated 10 times. After the completion of the laser application operation, the glass sample was observed through an optical microscope. With this, it was found that black lines were formed at intervals of 2 $\mu$m along a laser beam-applied region. The glass sample was then polished until the lines appeared on the outer surface thereof, and a surface analysis of the resultant product by EPMA was made with respect to Si, P and O. With this, it was found that the lines were formed of Si and P, and that Si and P were deposited owing to the laser beam application operation.

EXAMPLE 3

A raw material containing $B_2O_3$, $Al_2O_3$, $O_3$, $BaCO_3$, $CaCo_3$ was weighed 50 g so that glass having composition expressed by mol % of $50B_2O_3$—$20Al_2O_3$—$10BaO$—$20CaO$ was formed. The material was melted in a platinum crucible at 1450° C. for 60 minutes, and the resultant product was quenched. The glass thus obtained was cut and polished to produce a plate type sample of 3 mm in thickness. A laser beam having a pulse energy of 5 $\mu$J, a pulse width of 300 femto/seconds, a repeated cycle of 200 kHz and a wavelength of 600 nm was then applied to the glass sample for 3 seconds by the same method as that in Example 1, and the application of the laser beam was thereafter stopped once to move a focal position 1 $\mu$m in the X-direction. The laser beam was then applied again for 3 seconds. These operations were repeated 10 times, and the focal position was then moved 1 $\mu$m in the Z-axis-direction (direction toward the outer surface). An operation for carrying out the 3-second laser beam application to the same position of a different depth and then moving to the next position was repeated again. After the completion of the laser beam application operation, the glass sample was observed through an optical microscope. With this, it was found that black dots slightly contacted one another were deposited along a laser beam-irradiated region. These black dots were observed three-dimensionally through a confocal laser beam scanning microscope. With this, it was found that nearly spherical particles of around 2 $\mu$m in diameter were deposited and slightly contacted one another in the vertical direction (direction along the Z-axis). The glass sample was then polished until the particles appeared on an outer surface thereof, and the resultant glass sample was subjected to a surface analysis by EPMA, thereby ascertaining that the black dots were formed of B.

EXAMPLE 4

A raw material was weighed 30 g so that the composition thereof expressed by mol % became $60TeO_2$—$30V_2O_5$—$10ZrO_2$. The material was melted in a platinum crucible at 1500° C. for 60 minutes, and the resultant glass product was quenched. The glass thus obtained was cut and polished to produce a cubic sample of 10 mm in length of one side. The glass sample was then moved at a speed of 200 $\mu$m/sec in the –X direction as a laser pulse beam having a pulse energy of 1 $\mu$J, a pulse width of 70 femto-seconds, a repeated cycle of 300 kHz and a wavelength of 1.1 $\mu$m was convergently applied to the position in the glass sample which was 5 mm below an outer surface thereof by the same method as that of Example 1. The application of the laser pulse beam was then stopped once, and a focal position was moved 10 $\mu$m in the Y-direction. The glass sample was then moved at a speed of 200 $\mu$m/sec in the –X direction as the laser pulse beam was convergently applied thereto again. These operations were repeated 10 times. After the completion of the laser beam application operation, the glass sample was observed through an optical microscope. With this, it was found that a black line was formed along a region to which the laser beam had been applied. This black line was observed three-dimensionally through a confocal laser beam scanning microscope. With this, it was found that the line had a shape of a band of 2 $\mu$m in width and 100 $\mu$m in height. The glass sample was polished until the line appeared on an outer surface thereof, and the polished product was subjected to a surface analysis by EPMA, thereby ascertaining that the line was formed of Te.

EXAMPLE 5

A raw material was weighed 20 g so that the composition thereof expressed by mol % became $60TeO_2$—$20SeO_2$—$20ZrO_2$. The material was melted in a platinum crucible at 1500° for 60 minutes, and the resultant product was quenched. The glass thus obtained was cut and polished to produce a plate type sample of 2 mm in thickness. The glass sample was then convergently irradiated with a pulse beam having a pulse energy of 1 $\mu$J, a pulse width of 50 femto-seconds, a repeated cycle of 250 kHz and a wavelength of 1.3 μm for one second through a single lens of 100 mm in focal distance by the same method as that of Example 1, and the application of the laser beam was thereafter stopped once. A focal position was moved 1 μm in the X-direction, and the laser beam was applied again for 3 seconds. These operations were repeated 10 times, and the focal position was thereafter moved 1 μm in the Z-direction (direction toward the outer surface). The focal position moving operation was repeated with the laser beam applied again to the same position of a different depth for 3 seconds. After the completion of the laser beam application operation, the glass sample was observed through an optical microscope. With this, it was found that a laser beam-irradiated region was colored in black. This black region was observed three-dimensionally through a confocal laser beam scanning microscope, thereby discovering that the black region had a shape of a needle of 2 μm in diameter and 50 μm in length. The glass sample was then polished until the black line appeared on an outer surface thereof, and the polished product was subjected to a surface analysis by EPMA. With this, it was found that the deposited matter was formed of Te and Se.

EXAMPLE 6

A raw material was weighed 10 g so that the composition thereof expressed by mol % became $40SiO_2$—$20BaSiF_6$—$40Al_2O_3$. The material was melted in a high-density carbon crucible in a nitrogen atmosphere at 2000° C. for 10 minutes, and the resultant product was quenched to produce a glass sample. The glass sample was cut and polished to produce a plate type sample of 2 mm in thickness. The sample thus obtained was irradiated in the same manner as in Example 1 with a pulsed laser beam having a pulse energy of 10 μJ, a pulse width of 130 femto-seconds, a repeated cycle of 20 Hz and a wavelength of 800 nm, and the following steps (1)–(5) were carried out.

(1) The glass was scanned with a laser beam by moving the glass at a speed of 10 μm/sec in the X-direction.

(2) The application of the laser beam was stopped once, and a focal position was moved 1 μm in the Y-direction. The glass sample was then moved in the −X direction at a speed of 10 μm/sec as the laser beam is convergently applied thereto.

(3) The steps (1) and (2) above were repeated 10 times. (4) The focal position was moved 1 μm in the Z-axis-direction (direction toward an outer surface), and the steps (1), (2) and (3) were carried out.

(5) The steps (1)–(4) were repeated 10 times.

Figure 2:
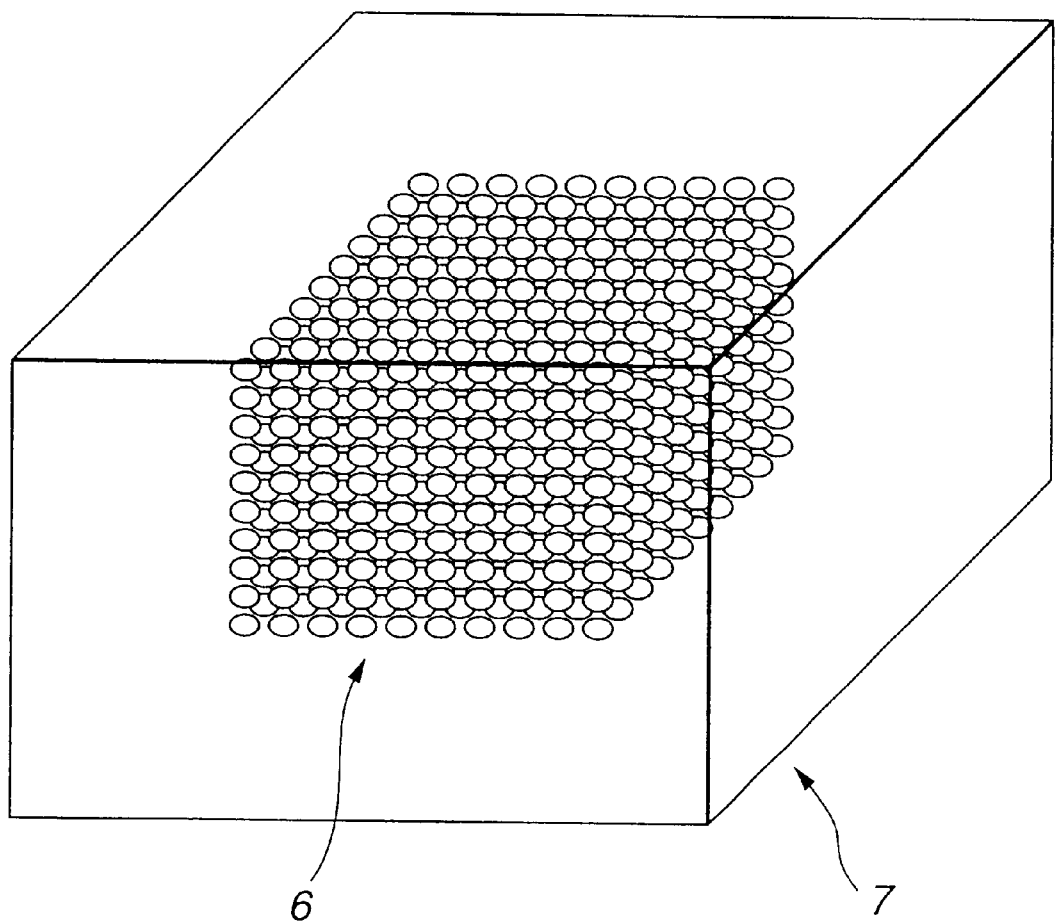
FIG. 2 is a schematic perspective view showing a three-dimensional periodic structure obtained in Example 6.

The glass sample was thereafter observed through an optical microscope and a confocal laser beam scanning microscope, With this, it was found that black dots (particle diameter of which was 0.5 μm) were formed three-dimensionally along a laser beam-applied region, thereby forming a three-dimensional cyclic structure 6 of the black dots in the glass sample 7, as shown in FIG. 2. The glass sample was then polished until the black dots appeared on an outer surface thereof, and the resultant product was subjected to a surface analysis by ESCA. With this, it was found that the black dots deposited in the pulsed laser beam irradiated region were formed of Si.

It was further ascertained that, when the pulse energy of the pulsed laser beam was regulated, it was also possible to form three-dimensional cyclic structures from the glass materials used in Examples 1–5.

As described above, according to the present invention, it is possible to provide a nonmetallic particle deposited glass in which nonmetallic particles are deposited in an arbitrary portion of the interior of a glass material by convergently applying a pulsed laser beam in the interior thereof. A region in which nonmetallic particles are deposited in a dotted or linear state is formed selectively in the interior of the glass material in a cycle the periodicity of which is substantially equal to that of a wavelength of the light. Thus, it is possible to form an artificial multidimensional cyclic structure having a cycle the periodicity of which is substantially equal to that of the wavelength of the light. Therefore, the nonmetallic particle deposited glass of the invention can be applied to optical function elements, such as an optical filter, a light multiplexing and demultiplexing device, a light diffusion compensation element, a laser oscillator, and a light amplifier which are adapted to control the light in a two-dimensional or three-dimensional space.

The entire disclosure of Japanese Patent Application No. 2000-043871 filed on Feb. 22, 2000, including specification, drawings, claims and summary, is incorporated herein by reference in its entirety.

What is claimed is:

1. A glass suitable for optical functional elements, said glass comprising:
   a matrix comprising a compound of at least one nonmetallic element; and
   a plurality of particles selectively formed in said matrix, said particles being made of said at least one nonmetallic element dissociated from said compound by condensing a pulsed laser beam in said matrix,
   wherein a pattern of said particles is selectively formed in said matrix.

2. A glass according to claim 1, wherein said compound is an oxide of said at least one nonmetallic element selected from the group consisting of Si, B, C, P, Se, and Te, and wherein said particles are made of said at least one nonmetallic element selected from the group consisting of Si, B, C, P, Se, and Te.

3. A glass according to claim 2, wherein said oxide is at least one selected from the group consisting of $SiO_2$, $B_2O_3$, $P_2O_5$, $SeO_2$, and $TeO_2$.

4. A glass according to claim 1, wherein said compound is a halide containing said at least one nonmetallic element selected from the group consisting of Si, B, C, P, Se, and Te.

5. A glass suitable for optical functional elements, said glass comprising:
   a matrix comprising a compound of at least one nonmetallic element; and
   a particle selectively formed in said matrix, said particle being made of said at least one nonmetallic element dissociated from said compound by condensing a pulsed laser beam in said matrix,
   wherein said compound is an organic compound such that said particle is made of carbon.

6. A glass suitable for optical functional elements, said glass comprising:
   a matrix comprising a compound of at least one nonmetallic element; and
   a particle selectively formed in said matrix, said particle being made of said at least one nonmetallic element dissociated from said compound by condensing a pulsed laser beam in said matrix,
   wherein a cation of said matrix of said glass is less reducible than an ion of said at least one nonmetallic element.

7. A glass according to claim 6, wherein said cation is at least one selected from the group consisting of Ti ion, Zr ion, and Al ion.

8. A glass according to claim 1, wherein a molar ratio of positive ions contained in said glass to negative ions contained in said glass is greater than a stoichiometric molar ratio of said positive ions to said negative ions.

9. A glass according to claim 1, wherein said particles have a diameter of 0.1–2 μm.

10. A glass according to claim 1, wherein said particles are in a form of dots and/or of a line.

11. A glass according to claim 1, wherein said particles are multidimensionally and periodically formed in said matrix.

12. A glass according to claim 1, wherein said matrix is made of at least one glass selected from the group consisting of oxide glasses, halide glasses, and chalcogenide glasses.

13. A process for producing a glass suitable for optical functional elements, said process comprising:

(a) providing a blank glass that is a raw material of said glass, said blank glass comprising a compound of at least one nonmetallic element;

(b) condensing a pulsed laser beam to a focal point in said blank glass such that a particle is selectively formed in said blank glass at a position corresponding to said focal point, said particle being made of said at least one nonmetallic element dissociated from said compound; and (c) moving said focal point in said blank glass to produce a pattern of said particle.

14. A process according to claim 13, wherein said pattern of said particle is in a form of dots and/or of a line.

15. A process according to claim 13, wherein said condensing is conducted intermittently by turning said pulsed laser beam on and off, while said focal point is moved in said blank glass.

16. A process according to claim 13, wherein said particle is formed multidimensionally and periodically in said blank glass.

17. A process according to claim 13, wherein a light absorption region of said blank glass is different from a wavelength of said pulsed laser beam.

18. A process according to claim 13, wherein said pulsed laser beam has a pulse width of not greater than 500 femto seconds.

19. A process according to claim 13, wherein said compound is an oxide of said at least one nonmetallic element selected from the group consisting of Si, B, C, P, Se, and Te.

20. A process according to claim 19, wherein said oxide is at least one selected from the group consisting of $SiO_2$, $B_2O_3$, $P_2O_5$, $SeO_2$, and $TeO_2$.

21. A process according to claim 13, wherein said compound is a halide containing said at least one nonmetallic element selected from the group consisting of Si, B, C, P, Se, and Te.

22. A process according to claim 13, wherein said compound is an organic compound such that said particle is made of carbon.

23. A process according to claim 13, wherein said blank glass further comprises a cation that is less reducible than an ion of said at least one nonmetallic element.

24. A process according to claim 23, wherein said cation is at least one selected from the group consisting of Ti ion, Zr ion, and Al ion.

25. A process according to claim 13, wherein a molar ratio of positive ions contained in said blank glass to negative ions contained in said blank glass is greater than a stoichiometric molar ratio of said positive ions to said negative ions.

26. A process according to claim 13, wherein said blank glass is made of at least one glass selected from the group consisting of oxide glasses, halide glasses, and chalcogenide glasses.

* * * * *